(12) United States Patent
Ueda

(10) Patent No.: US 7,728,055 B2
(45) Date of Patent: Jun. 1, 2010

(54) PROCESS FOR PRODUCING COAGULATED LATEX PARTICLES

(75) Inventor: Takashi Ueda, Kakogawa (JP)

(73) Assignee: Kaneka Corporation, Osaka (JP)

( * ) Notice: Subject to any disclaimer, the term of this patent is extended or adjusted under 35 U.S.C. 154(b) by 172 days.

(21) Appl. No.: 11/921,440

(22) PCT Filed: Jul. 12, 2006

(86) PCT No.: PCT/JP2006/313846

§ 371 (c)(1),
(2), (4) Date: Dec. 3, 2007

(87) PCT Pub. No.: WO2007/013305

PCT Pub. Date: Feb. 1, 2007

(65) Prior Publication Data

US 2009/0124778 A1 May 14, 2009

(30) Foreign Application Priority Data

Jul. 28, 2005  (JP) .............................. 2005-218628

(51) Int. Cl.
*C08L 5/04* (2006.01)

(52) U.S. Cl. .................... 524/28; 523/330; 523/335; 523/352; 524/23; 524/27; 524/43; 524/44; 524/127; 524/156; 524/157; 524/219; 524/417; 524/421; 524/422; 524/423; 524/425; 524/429; 524/435; 524/436; 524/437

(58) Field of Classification Search ................. 523/330, 523/335, 352; 524/23, 27, 28, 43, 44, 127, 524/156, 157, 219, 417, 421, 422, 423, 425, 524/429, 435, 436, 437
See application file for complete search history.

(56) References Cited

U.S. PATENT DOCUMENTS

| | | | | |
|---|---|---|---|---|
| 4,031,302 A | * | 6/1977 | Shimizu et al. | 528/486 |
| 4,194,999 A | * | 3/1980 | Hayashi et al. | 524/28 |
| 4,539,396 A | * | 9/1985 | Yasui et al. | 528/481 |
| 4,767,803 A | * | 8/1988 | Yasui et al. | 523/335 |

FOREIGN PATENT DOCUMENTS

| | | | |
|---|---|---|---|
| DE | 1 100 961 | | 3/1961 |
| EP | 1 834 991 | | 9/2007 |
| GB | 1 516 476 | | 7/1978 |
| GB | 1588467 | * | 4/1981 |
| JP | 49-14550 | | 2/1974 |
| JP | 52-3637 | | 1/1977 |
| JP | 53-30647 | | 3/1978 |
| JP | 58-87102 | | 5/1983 |
| JP | 62-236828 | | 10/1987 |
| JP | 2-173002 | | 7/1990 |
| JP | 2004-300426 | | 10/2004 |
| WO | 03/022891 | | 3/2003 |
| WO | 2006/070590 | | 7/2006 |
| WO | 2006/070591 | | 7/2006 |
| WO | 2006/092897 | | 9/2006 |

OTHER PUBLICATIONS

Supplementary European Search Report issued Aug. 28, 2009 in corresponding European Application No. 06 78 1016.
XP-002536195, Database WPI Week 200482, Thomas Scientific, London, GB, Oct. 28, 2004.
J. Tu et al., Alginate microparticles prepared by spray-coagulation method: Preparation, drug loading and release characterization, International Journal of Pharmaceutics, 303, 2005, pp. 171-181.

* cited by examiner

*Primary Examiner*—David Wu
*Assistant Examiner*—Marie Reddick
(74) *Attorney, Agent, or Firm*—Wenderoth, Lind & Ponack, L.L.P.

(57) ABSTRACT

An object of the present invention is to provide a new granulating process which can recover desired coagulated latex particles with a significantly excellent yield, and can suppress secondary coagulation under the condition having a higher temperature than a softening point of a polymer, without deteriorating the original quality of the polymer itself. A process for producing coagulated latex particles which can suppress the secondary coagulation under the condition having the broad temperature range, without deteriorating the original quality of the polymer itself by spraying or dropping a polymer latex into a gas-phase containing an inorganic salt and/or an acid, and a dispersant in an aerosol form, and dropping or feeding the droplets of the polymer latex into an aqueous phase containing a dispersant.

16 Claims, No Drawings

PROCESS FOR PRODUCING COAGULATED LATEX PARTICLES

TECHNICAL FIELD

The present invention relates to a process for producing coagulated latex particles. In more detail, the present invention relates to a process for producing coagulated latex particles from a polymer latex with a satisfactory yield.

BACKGROUND ART

In order to recover a desired polymer contained in a latex from a polymer latex prepared by emulsion polymerization or suspension polymerization, granulating processes for coagulating and granulating the latex are required. Polymers are recovered from polymer lattices by the following procedure: a coagulant is added to a polymer latex at a temperature sufficiently lower than the softening temperature of the polymer to form coagulated latex particles. The resulting mixture is then heated to at least the softening temperature of the polymer to produce slurry, followed by dehydrating and drying. Thus, a powdered polymer is recovered. In this process, the reason for setting a temperature sufficiently lower than the softening temperature of the polymer when a coagulant is added to a polymer latex is to suppress the secondary coagulation among the coagulated latex particles generated. In general, when a coagulant is added at a temperature more than the softening temperature of the polymer, generation of rough and large coagulated latex particles frequently occurs, and in the worst case, it may happen that the whole latex particles get aggregated.

As opposed to the above process, granulating processes of a polymer latex which can obtain coagulated latex particles having satisfactory powder properties, a gas-phase coagulation process (for example, see JP-A-53-30647), a moderate coagulation process (for example, see JP-A-60-217224), a granulating process using a spray dryer, and the like are widely known. Even though these processes are employed, in view of suppressing the secondary coagulation, granulating processes at a temperature lower than a softening temperature of a polymer is desirable, and for the purpose, in general, the granulating processes are conducted at a temperature around or lower than the softening temperature of the polymer.

However, it can not be better to set a temperature lower in the above granulating processes, when the granulation temperature is set too lower than the softening temperature of the polymer, mechanical strength of the coagulated latex particles generated tends to lower, thus, a large amount of a fine powder is generated, which may cause a factor of problems in the steps such as a filter fabric clogging.

Namely, in the conventional granulating processes, it is important to suppress the secondary coagulation and generation of fine powder in order to obtain coagulated latex particles having a desired particle size with a satisfactory yield, and it is essential to operate in a temperature range for granulating at which influences of both secondary coagulation and generation of fine powder is minimum (generally, from around a polymer softening temperature to about 10° C. lower than it). However, when the granulating temperature fluctuates due to various factors during producing process, it is a problem of producing process to cause troubles such as lowering the yield by secondary coagulation and impairing filterability by generation of fine powder.

In addition, the conventional granulating processes has restriction in compositions of a polymer possible to be recovered, as for a rubbery polymer latex having the softening point of the polymer at most 0° C., when water is a medium, it is difficult even to set a temperature of the system within the range of the optimum granulating temperatures. Also when the granulating processes are conducted at around 0° C., the secondary coagulation frequently occurs, and the coagulated latex particles can not be obtained with a satisfactory yield.

In addition to the above granulating techniques, as a process for granulating a rubbery polymer latex having a softening temperature of the polymer of room temperature or lower, which is extremely difficult to be granulated due to easiness in the secondary coagulation, a process of adding a high-molecular weight polyanion having a carboxyl group and/or a hydroxyl group in its molecule to a rubber latex, and dropping the mixed latex into an aqueous solution containing at least one alkaline earth metal is known (for example, see JP-A-52-37987).

In this process, however, for example, at least 2 to 8 parts by weight and preferably 4 to 6 parts by weigh of the high-molecular weight polyanion must be added relative to 100 parts by weight of rubber solid content of the rubber latex, the viscosity of the resulting mixed latex must be adjusted to 200 to 8,000 m·Pa·s, and subsequently the latex must be dropped from 1 to 80 cm higher than the liquid level of a coagulant. Thus, according to the description of this process, satisfactory spherical coagulated latex particles cannot be produced unless many conditions are satisfied.

In general, it is easily assumed that the addition of 2 parts by weight or more of a high-molecular weight polyanion to a polymer latex causes the following problems, and thus this is not a satisfactory process. Examples of the problems are as follows: (1) The original quality (for example, thermal stability) of a recovered polymer itself used for various purposes may be deteriorated; (2) The addition of a large amount of high-molecular weight polyanion leads to the significant increase in the production cost; and (3) Since the viscosity of the latex, which is generally 10 m·Pa·s or less, must be adjusted to 200 m·Pa·s or more and preferably 1,000 m·Pa·s or more by adding the high-molecular weight polyanion, the transferring property of the resulting latex liquid is impaired.

On the other hand, we developed the technology which can recover the desired coagulated latex particles with a satisfactory yield, suppressing the secondary coagulation and generation of a fine powder, under the temperature condition having as a broad range as possible, without deteriorating the original quality of the polymer itself, and filed the technology (Japanese Patent Application No. 2005-052783). In this process, the coagulated latex particles having a desired particle size can be recovered with an extremely satisfactory yield compared with the conventional granulating processes, by suppressing the secondary coagulation among coagulated latex particles entering into the aqueous phase. However, in this process, it is difficult to suppress the secondary coagulation by collision and uniting among the coagulated latex particles in the gas phase, thus, further development in efficiency has been desired.

DISCLOSURE OF INVENTION

In order to provide the above problems with a solution, it is an object of the present invention to provide a new granulating process which can recover desired coagulated latex particles with a significantly excellent yield, and can suppress secondary coagulation under the condition having a higher temperature than a softening temperature of a polymer, without deteriorating the original quality of the polymer itself.

In view of the above present situation, the present inventors have conducted intensive research and found the coagulation process of latex particles which can suppress the secondary coagulation under the condition having a broad temperature range, without deteriorating the original quality of the polymer itself by spraying or dropping a polymer latex into a gas-phase containing an inorganic salt and/or an acid, and a dispersant in an aerosol form, and dropping or feeding the droplets of the polymer latex into an aqueous phase containing a dispersant. Consequently, the present invention has been accomplished.

The present invention relates to a process for producing coagulated latex particles comprising:

spraying or dropping a polymer latex into a gas-phase containing an inorganic salt and/or an acid, and a dispersant in an aerosol form; and dropping or feeding the droplets of the polymer latex into an aqueous phase containing a dispersant.

A preferred embodiment relates to the process for producing coagulated latex particles described in the above process, wherein the polymer latex contains a water-soluble polymer compound having a physical gel-forming property.

A preferred embodiment relates to the process for producing coagulated latex particles described in any one of the above processes, wherein the softening temperature of the polymer in the polymer latex is at most 60° C.

A preferred embodiment relates to the process for producing coagulated latex particles described in any one of the above processes comprising:

spraying or dropping the droplets of the polymer latex into a gas-phase containing a dispersant in an aerosol form within the range of 0.01 to 10 parts by weight based on 100 parts by weight of the polymeric solid content in the polymer latex; and dropping or feeding the droplets of the polymer latex into a liquid-phase containing a dispersant within the range of 0.01 to 10 parts by weight based on 100 parts by weight of the polymeric solid content in the polymer latex. An amount of the dispersant in the gas-phase is 0.1 to 5 parts by weight, and an amount of the dispersant in the liquid-phase is preferably 0.1 to 5 parts by weight.

A preferred embodiment relates to the process for producing coagulated latex particles described in any one of the above processes, wherein the polymer latex contains 0.01 to 3.0 parts by weight of a water-soluble polymer compound having a physical gel-forming property based on 100 parts by weight of the polymeric solid content in the polymer latex. An amount of the water-soluble polymer compound is preferably 0.05 to 1.8 parts by weight.

A preferred embodiment relates to the process for producing coagulated latex particles described in any one of the above processes, wherein the polymer latex contains 0.05 to 1.8 parts by weight of a water-soluble polymer compound having a physical gel-forming property based on 100 parts by weight of the polymeric solid content in the polymer latex.

A preferred embodiment relates to the process for producing coagulated latex particles described in any one of the above processes, wherein the dispersant is at least one kind selected from a nonionic polymer surfactant, an anionic surfactant, a nonionic surfactant, an ampho-ionic surfactant, a cationic surfactant, and an inorganic dispersant.

A preferred embodiment relates to the process for producing coagulated latex particles described in any one of the above processes, wherein the nonionic polymer surfactant is at least one kind selected from a partially-saponified polyvinyl alcohol, a partially-saponified polymethyl methacrylate, polyacrylic acid and salts thereof, methyl cellulose, hydroxymethyl cellulose, hydroxyethyl cellulose, polyalkyleneoxide, polyvinylpyrrolidone, polyvinylimidazole, polyacrylamide, and sulfonated polystyrene.

A preferred embodiment relates to the process for producing coagulated latex particles described in any one of the above processes, wherein the anionic surfactant is at least one kind selected from carboxylates, sulfonates, salts of sulfate ester, and salts of phosphate ester.

A preferred embodiment relates to the process for producing coagulated latex particles described in any one of the above processes, wherein the water-soluble polymer compound having a physical gel-forming property is at least one compound selected from hydroxyethylmethyl cellulose, hydroxypropylmethyl cellulose, carboxymethyl cellulose, water-soluble alginic acid derivatives, agar, gelatin, carrageenan, pectin, and polyacrylic acid derivatives.

A preferred embodiment relates to the process for producing coagulated latex particles described in any one of the above processes, wherein the gas-phase contains 0.2 to 20 parts by weight of the inorganic salt and/or the acid relative to 100 parts by weight of the polymeric solid content in the polymer latex.

A preferred embodiment relates to the process for producing coagulated latex particles described in any one of the above processes, wherein the inorganic salt is at least one salt selected from sodium salts, potassium salts, calcium salts, magnesium salts, aluminum salts, iron salts, barium salts, zinc salts, copper salts, potassium alum, and iron alum.

A preferred embodiment relates to the process for producing coagulated latex particles described in any one of the above processes, wherein the acid is at least one inorganic acid selected from hydrochloric acid, sulfuric acid, nitric acid, and phosphoric acid and/or at least one organic acid selected from acetic acid and formic acid.

A preferred embodiment relates to the process for producing coagulated latex particles described in any one of the above processes, wherein the water-soluble polymer compound having a physical gel-forming property is a water-soluble alginic acid derivative.

A preferred embodiment relates to the process for producing coagulated latex particles described in any one of the above processes, wherein the inorganic salt is a calcium salt.

A preferred embodiment relates to the process for producing coagulated latex particles described in any one of the above processes, wherein the polymer latex sprayed or dropped into the gas-phase has a volume-average droplet size of 50 μm to 5 mm.

A preferred embodiment relates to the process for producing coagulated latex particles described in any one of the above processes, wherein the polymer latex has a polymeric solid content of 10 to 55% by weight.

A preferred embodiment relates to the process for producing coagulated latex particles described in any one of the above processes, wherein 10 to 10,000 parts by weight of water based on 100 parts by weight of the polymeric solid content in the polymer latex is fallen down along with the inside wall of a container to which the polymer latex, the inorganic salt and/or the acid and the dispersant are sprayed.

BEST MODE FOR CARRYING OUT THE INVENTION

The polymer latex used in the present invention is not particularly limited. For example, polymer lattices produced by emulsion polymerization, suspension polymerization, microsuspension polymerization, miniemulsion polymerization, or aqueous dispersion polymerization can be used. Among these, from the viewpoints that structure control is easy and coagulated latex particles having satisfactory powder properties can be obtained, polymer lattices produced by emulsion polymerization are preferably used.

Examples of the polymer particles included in the polymer latex produced by emulsion polymerization include: (1) a polymer prepared by polymerization of a monomeric mixture containing 50 to 100% by weight of an acrylate, 0 to 50% by weight of an methacrylate, 0 to 40% by weight of an aromatic vinyl monomer, 0 to 30% by weight of a vinyl monomer copolymerizable with the acrylate, the methacrylate and the aromatic vinyl monomer, and 0 to 5% by weight of a multifunctional monomer; and (2) a polymer prepared by polymerization of a monomeric mixture containing 50 to 100% by weight of butadiene, 0 to 40% by weight of an aromatic vinyl monomer, 0 to 30% by weight of a vinyl monomer copolymerizable with butadiene and the aromatic vinyl monomer, and 0 to 5% by weight of a multifunctional monomer. Any one of these polymer lattices can be preferably used because of a reason described below. As the polymer latex (1), a polymer latex obtained by polymerizing a monomer mixture comprising 75 to 99.45 parts by weight of acrylate, 0.5 to 25 parts by weight of mathacrylate, 0 to 10 parts by weight of an aromatic vinyl monomer, 0 to 10 parts by weight of a vinyl monomer copolymerizable with the acrylate, methacrylate and aromatic vinyl monomer, and 0.05 to 3 parts by weight of a multifunctional monomer is preferable. As the polymer latex (2), a polymer latex obtained by polymerizing monomer mixture comprising 60 to 99.5 parts by weight of butadiene, 0 to 39.5 parts by weight of an aromatic vinyl monomer, 0 to 25 parts by weight of a vinyl monomer copolymerizable with the butadiene and aromatic vinyl monomer, and 0 to 3 parts by weight of a multifunctional monomer is preferable. In addition, a particle structure of the polymer in those polymer lattices may be a single layer or a graft polymer having at least double layer structure within the range of exemplified composition ratios, but is not particularly limited.

Typical processes for producing the above-described polymer lattices are described in detail in, for example, JP-A-2002-363372 and JP-A-2003-119396, but are not limited to these.

The polymer lattices described above are preferably used because such polymer lattices have been widely used as quality modifiers for thermoplastic resins, and their various effects of improving quality can be exhibited even when the polymer lattices are recovered as coagulated latex particles of the present invention. However, polymer lattices usable in the present invention are not limited to these. For example, latex polymer particles in a latex prepared by copolymerization or graft polymerization of a monomer composition mainly composed of at least one monomer selected from the following monomer group may be used alone or as a mixture. Examples of the monomer group include (1) alkyl acrylates containing an alkyl group having up to 10 carbon atoms, for example, methyl acrylate, ethyl acrylate, butyl acrylate, and 2-ethylhexyl acrylate; (2) alkyl methacrylates containing an alkyl group having up to 10 carbon atoms, for example, methyl methacrylate, ethyl methacrylate, butyl methacrylate, and 2-ethylhexyl methacrylate; (3) vinylarenes such as styrene, α-methylstyrene, monochlorostyrene, and dichlorostyrene; (4) vinylcarboxylic acids such as acrylic acid and methacrylic acid; (5) vinyl cyanides such as acrylonitrile and methacrylonitrile; (6) vinyl halides such as vinyl chloride, vinyl bromide, and chloroprene; (7) vinyl acetate; (8) alkenes such as ethylene, propylene, butylene, butadiene, and isobutylene; and (9) multifunctional monomers such as allyl methacrylate, diallyl phthalate, triallyl cyanurate, monoethyleneglycol dimethacrylate, tetraethyleneglycol dimethacrylate, divinylbenzene, and glycidyl methacrylate, but are not limited thereto.

The average particle size of the polymer particles is not particularly limited. However, polymer particles having a volume-average particle size of 0.01 to 15 μm, preferably 0.05 to 10 μm, which is the particle size in typical emulsion polymerization, suspension polymerization, or the like, can be preferably used. The volume-average particle size of the polymer particles may be measured with, for example, a MICROTRAC UPA (manufactured by NIKKISO Co., Ltd.).

The polymeric solid content in the polymer latex in the present invention is not particularly limited as long as an object of the present invention is achieved but is preferably 10 to 55% by weight and more preferably 20 to 45% by weight. When the polymeric solid content in the polymer latex is less than 10% by weight, a large amount of water is necessary in order to reduce the solid content from 30 to 40% by weight, which is a polymeric solid content after typical emulsion polymerization or suspension polymerization, to less than 10% by weight. Consequently, the load in wastewater treatment is increased. On the other hand, a solid content of the polymer latex exceeding 55% by weight does not particularly affect the granulation operation of the present invention. However, in such a case, the polymerization operation tends to be difficult. For example, the heat generation in polymerization is difficult to be controlled or a scale is frequently produced in a polymerization tank. The polymeric solid content in a polymer latex can be measured by placing 0.5 g of the latex in a hot air convection dryer at 120° C. for 3 hours to volatilize moisture and then calculating the polymeric solid content in the latex from the weights of the latex before drying and the polymer after drying.

In the present invention, a polymer softening temperature of the polymer latex is not particularly limited. However, it is preferable to use a polymer latex having a softening temperature of at most 60° C., preferably at most 50° C., from the viewpoint that the suppression of the secondary coagulation, which is one of the objects in the present invention, tends to significantly appear in the case of using to the polymer latex having a softening temperature of at most 60° C., which has a problem of the secondary coagulation at preparing in the conventional granulating processes.

In the present invention, a softening temperature refers to a temperature at which a water content ratio in polymer coagulated particles lowers by at least 5% by weight than a water content ratio before heating, when a water suspension of the polymer coagulated particles obtained by salting-out is heated. The polymer softening temperature can be measured by the following methods. First, a polymer latex is placed into a dialysis tube, the tube was knotted at both ends and immersed in a 3% by weight-calcium chloride solution having a liquid temperature of 1° C. for 8 hours to completely terminate coagulation, and a coagulated article in the tube shape is obtained. A heat treatment is carried out on the obtained coagulated article, for example, by immersing in water having a temperature increased by each 5° C. from 5° C. to 60° C., and water in the tube coagulated articles obtained at each temperature is evaporated by using a hot air convection dryer. A water content ratio is found from an amount of the tube coagulated article before drying and an amount of the tube coagulated article after drying, and a temperature at which the water content ratio is lowered by at least 5% by weight than the water content ratio before heating is to be a softening temperature.

When latex droplets are sprayed or dropped in a gas phase in the present invention, it is necessary that an inorganic salt and/or an acid, and a dispersant are contained in a gas-phase in an aerosol form. The main purpose for containing the dispersant in a gas-phase in an aerosol form in the present invention is to suppress the secondary coagulation among coagulated latex particles in the gas-phase. Namely, when the coagulated latex particles descend in the gas-phase, the coagulated latex particles capture dispersant mist, and its surface is protected with the dispersant, as a result, in the case where collision among the coagulated latex particles is caused in the gas-phase, those particles descend in the gas-phase without uniting (the secondary coagulation), and enter the liquid-phase. Further, since the dispersant contained in a gas-phase in an aerosol form is taken into the liquid-phase in a large part at last, the dispersant functions as a dispersant of the coagulated latex particles in the liquid-phase, and the secondary coagulation can be suppressed. Namely, in the production process of the present invention, wherein a dispersant is contained in a gas-phase in an aerosol form, the secondary coagulation of the coagulated latex particles can be suppressed both in the gas-phase and the liquid-phase, as a result, it becomes possible to almost completely suppress the secondary coagulation.

In the conventional granulating processes, it is important to suppress the secondary coagulation and generation of fine powder in order to obtain coagulated latex particles having a desired particle size with a satisfactory yield, and it is essential to operate in a temperature range for granulating at which influences of both secondary coagulation and generation of fine powder is minimum (generally, from around a polymer melting temperature to about 10° C. lower than it). However, in the present invention, by using a dispersant, a limitation of the temperature range for granulating at a higher temperature is substantially relaxed. Thereby, it becomes possible to obtain the desired coagulated latex particles with an extremely high yield under the moderate temperature condition, regarding a polymer latex having a polymer softening temperature of at least 0° C., which conventionally has difficulty in granulating, in addition to effects of improving an operationality and suppressing generation of fine powder.

Conventionally, the dispersant in the present invention is not particularly limited as long as it has an effect of dispersion-stabilizing the coagulated latex particles, for example, anionic surfactant, nonionic polymer surfactant, nonionic surfactant, amphoteric surfactant, cationic surfactant, and an inorganic dispersant such as tricalcium phosphate, and magnesium hydroxide can be exemplified. Among these, from the viewpoint that satisfactory dispersion stability of the coagulated particles can be obtained, nonionic polymer surfactant and/or anionic surfactant can be preferably used, and anionic surfactant is the most preferably used. These can be suitably used with one kind or in combination of at least two kinds thereof.

Among these, the reason for the most preferably using an anionic surfactant is that filterability tends to be more excellent than a case of using other dispersant when a water suspension of the coagulated latex particles, in which coagulation is terminated, is dehydrated by filtering. However, in view of the suppression of the secondary coagulation, an anionic surfactant does not have so much difference compared that nonionic polymer surfactants or other dispersants are used, and there is no limitation thereto.

As examples of the nonionic polymer surfactant which can be used for the above-described purpose, a nonionic surfactant comprising one or a mixture of at least two kinds selected from the following group can be exemplified. Specific examples are a partially-saponified polyvinyl alcohol, a partially-saponified methyl methacrylate, polyacrylic acid and salts thereof, methyl cellulose, hydroxymethyl cellulose, hydroxyethyl cellulose, polyalkyleneoxide, polyvinylpyrrolidone, polyvinylimidazole, polyacrylamide, and sulfonated polystyrene. Among these, from the viewpoint of having high effect of suppressing the secondary coagulation among the coagulated latex particles, a partially-saponified polyvinyl alcohol, methyl cellulose, hydroxymethyl cellulose, polyalkyleneoxide are preferably used, and a partially-saponified polyvinyl alcohol is more preferably used. However, there is no limitation thereto.

On the other hand, as examples of the anionic polymer surfactant which can be used for the above-described purpose, an anionic surfactant comprising one or a mixture of at least two kinds selected from the following group can be exemplified. Specific examples are carboxylates such as aliphatic monocarboxylate, polyoxyethylene alkylethercarboxylate, N-alkylsarcosinate and N-acylglutamate; sulfonates such as dialkylsulfosuccinate, alkanesulfonate, α-olefinsulfonate, linear alkylbenzenesulfonate, alkyl (brached)benzenesulfonate, benzenesulfonate, naphthalenesulfonate-formaldehyde condensate, alkylnaphthalenesulfonate and N-methyl-N-acyltaurinate; salts of sulfate ester such as salt of alkylsulfate ester, alcohol ethoxysulfate and salt of fatty sulfate ester; and salts of phosphate ester such as alkylphosphate, salt of polyoxyethylene alkyletherphosphate and salt of polyoxyethylene alkylphenyletherphosphate. Among these, from the viewpoint of having high effect of suppressing the secondary coagulation among the coagulated latex particles, carboxylates, sulfonates, salts of sulfate ester, and phosphate esters can be favorably used, and sulfonates and salts of sulfate ester can be further favorably used. More specifically, examples of sulfonates and salts of sulfate ester which can be used in the present invention are sodium laurylsulfate, ammonium laurylsulfate, sodium dodecylbenzenesulfonate, and sodium dioctyl sulfosuccinate, but are not limited these examples.

When those anionic surfactants are added to a liquid-phase containing an inorganic salt, which is at least divalent, as a coagulant, the anionic surfactants may form salts with difficulty in dissolving in water by reacting with the inorganic salt in some cases. However in those cases, the anionic surfactants have sufficient effect of suppressing the secondary coagulation among the coagulated latex particles and can be used according to the object of the present invention.

An amount of a dispersant contained in the gas-phase in an aerosol form in the present invention is preferably in the range of 0.01 to 10 parts by weight, more preferably in the range of 0.1 to 5 parts by weight, and the most preferably in the range of 0.1 to 3 parts by weight relative to 100 parts by weight of the polymeric solid content in the polymer latex. Also, an amount of a dispersant contained in the liquid-phase is preferably in the range of 0.01 to 10 parts by weight, more preferably in the range of 0.1 to 5 parts by weight, and the most preferably in the range of 0.1 to 3 parts by weight relative to 100 parts by weight of the polymeric solid content in the polymer latex. Therefore, in the present invention, when the dispersant contained in the gas-phase in an aerosol form is all taken in the liquid-phase, the 0.02 to 20 parts by weight of the dispersants relative to 100 parts by weight of the polymeric solid content in the polymer latex consequently exist in the reaction system.

When an amount of the dispersant contained in the gas-phase in an aerosol form or the dispersant added in the liquid-phase is respectively less than 0.01 part by weight, dispersion stabilization effect for the coagulated latex particles is lowered, and the effect of suppressing the secondary coagulation among the coagulated latex particles tends to be hardly obtained. On the other hand, when an amount of the dispersant contained in the gas-phase in an aerosol form or the dispersant added in the liquid-phase is respectively more than 10 parts by weight, although the secondary coagulation among the coagulated latex particles can be suppressed, a large amount of the dispersants are remained in the coagulated latex after recovery, which may cause adverse effects on quality such as heat stability in some cases.

In the present invention, the reason for previously adding a dispersant in the liquid-phase is to secure dispersion stability of the coagulated latex particles entered in the liquid-phase. In the present invention, the same effect can be exerted by taking the dispersant contained in the gas-phase in an aerosol form into the liquid-phase. However, when the coagulated latex particles enter in the liquid-phase before taking the dispersant contained in the gas-phase in an aerosol form into the liquid-phase, the secondary coagulation among the coagulated latex particles is proceeded since the dispersant does not exist in the liquid-phase. Therefore, as the present invention, by previously adding the dispersant in the liquid-phase, it becomes possible to suppress the secondary coagulation caused by a low concentration of the dispersant in the liquid-phase. However, when the dispersant contained in the gas-phase is quickly, uniformly, and securely taken in the liquid-phase, the secondary coagulation can be suppressed in some cases without previously adding the dispersant in the liquid-phase. Namely, performing the operation that the dispersant contained in the gas-phase is quickly entered in the liquid-phase by devices on an equipment can be substantially included in the category of the present invention, since the operation has chemically the same meaning as previously adding the dispersant in the liquid-phase.

In the present invention, a process of containing the dispersant in an aerosol form is not particularly limited, examples are a process of continuously feeding (spraying) a specified amount of a dispersant adjusting with an amount of spraying or dropping the polymer latex, or a process of feeding (spraying) a dispersant which is previously mixed with a specified amount of an aqueous solution of a coagulant as a mixed solution with a coagulant, but the process is not limited to these examples. In addition, an aerosol form is not particularly limited as long as being a mist form, but a volume-average particle size of the droplets of a dispersion is preferably 0.01 to 200 μm, more preferably 0.01 to 100 μm, particularly preferably 0.01 to 50 μm, and most preferably 0.01 to 10 μm. As an operation to make the dispersant in an aerosol form, an example is a process of utilizing, for example, a two-fluid nozzle or an atomizer and the like, but is not limited to the example. Further, it is preferable to use a dispersant adjusted to have a specified concentration as an aqueous solution from the viewpoint that the process is easy and simple, but the dispersant is not limited thereto. As a concentration of the aqueous solution of the dispersant, an example is 0.01 to 10% by weight, and preferably 0.05 to 5% by weight.

In the present invention, by containing a water-soluble polymer compound having a physical gel-forming property in the polymer latex, it can be realized to prepare coagulated latex particles further more excellent in view of reduction of fine power and coarse powder during granulating step, or powder properties such as anti-blocking property and powder flow property. Herein, the term "physical gel" means a gel containing a physical crosslinking formed by a hydrogen bond, an ionic bond, or the formation of a chelate between polymer molecules. The above-described phrase "having a physical gel-forming property" means that the change from a viscous fluid (sol) to an elastomer (gel) can be visually observed when an operation for gelation, for example, the addition of an inorganic salt or an acid or heating, is performed to an aqueous solution containing only a water-soluble polymer compound. The term "water-soluble polymer compound having a physical gel-forming property" is defined as a water-soluble polymer compound having the above property.

The water-soluble polymer compound having a physical gel-forming property usable in the present invention is not particularly limited as long as the above property can be exhibited. For example, a water-soluble polymer compound composed of a compound or a mixture containing two or more compounds selected from the following group can be used. Examples thereof include water-soluble alginic acid derivatives such as alginic acid, sodium alginate, potassium alginate, and ammonium alginate; hydroxyethylmethyl cellulose; hydroxypropylmethyl cellulose; carboxymethyl cellulose; agar; gelatin; carrageenan; pectin; and polyacrylic acid derivatives. In order to achieve the object of the present invention, among these, carboxymethyl cellulose, water-soluble alginic acid derivatives, and polyacrylic acid derivatives are more preferable. Among these, water-soluble alginic acid derivatives are most preferably used.

Examples of the water-soluble alginic acid derivatives include alginic acid, sodium alginate, potassium alginate, and ammonium alginate, but are not limited to these as long as the derivatives have a property of forming a physical gel by reacting with a polyvalent metal salt or an acid. The ratio between mannuronic acid and guluronic acid in the water-soluble alginic acid derivative is not particularly limited. However, higher ratio of guluronic acid is preferable because the ability of forming a physical gel tends to increase. Therefore, the ratio of guluronic acid in the water-soluble alginic acid derivative is generally at least 5% by weight and more preferably at least 30% by weight.

Also, the molecular weight of the water-soluble polymer compound represented by the above water-soluble alginic acid derivatives is not particularly limited. In view of the transferring property of the liquid during production, the viscosity of a 1.0% by weight aqueous solution measured with a B-type viscometer is preferably 2 to 22,000 m·Pa·s and more preferably 2 to 1,000 m·Pa·s.

A purpose of adding a water-soluble polymer compound having a physical gel-forming property to a polymer latex is to improve the shape retention of coagulated latex particles during the granulation. That is, when the polymer latex is coagulated in a gas-phase, gelation of the water-soluble polymer compound proceeds at the same time. Thereby, on the surfaces of latex droplets, a gel film is formed in competition with the coagulation of the polymer latex. As a result, the mechanical strength of the surfaces of the latex droplets is improved, thus suppressing a phenomenon that the shape of coagulated latex particles is changed to an irregular shape by an impact when the coagulated latex particles enter a liquid-phase from the gas-phase, and at the same time, generation of fine powder due to destruction of the coagulated latex particles is considered to be suppressed. According to that, the obtained coagulated particles becomes spherical, and the generation of fine powder is suppressed, thereby, it becomes possible to further improve powder properties such as anti-blocking property and powder flow property.

The content of the water-soluble polymer compound having a physical gel-forming property in the present invention is not particularly limited as long as the object of the present invention can be achieved. However, from the above-described viewpoint, the content is preferably 0.01 to 3.0 parts by weight, more preferably 0.01 to 1.8 parts by weight, particularly further more preferably 0.05 to 1.8 parts by weight, and the most preferably 0.1 to 1.5 parts by weight relative to 100 parts by weight of the polymeric solid content in a polymer latex. When the content of the water-soluble polymer compound having a physical gel-forming property in the present invention is less than 0.01 parts by weight relative to 100 parts by weight of the polymeric solid content in the polymer latex, a gel film due to the water-soluble polymer compound is not sufficiently formed on the surfaces of latex droplets sprayed or dropped in the gas-phase. Consequently, since the coagulated latex particles become an irregular shape, or the generation of fine powder is easily caused by an impact when the particles enter a liquid-phase, it may be difficult to obtain a powder having satisfactory powder properties. On the other hand, when the content of the water-soluble polymer compound having a physical gel-forming property exceeds 3.0 parts by weight, a large amount of substance derived from the water-soluble polymer remains in the recovered coagulated latex particles. In such a case, the quality such as thermal stability tends to be impaired. Furthermore, the viscosity of the mixed latex increases, which may result in a difficulty in handleability such as the transferring property of the liquid.

JP-A-52-37987 discloses a process of adding a high-molecular weight polyanion having a carboxyl group and/or a hydroxyl group in its molecule to a rubber latex, and dropping the mixed latex into an aqueous solution containing at least one alkaline earth metal as a process for granulating a rubbery polymer latex that is extremely difficult to be recovered in a particle form.

According to the description of this process, at least 2.0 parts by weight and preferably 4.0 parts by weight of the high-molecular weight polyanion must be added to 100 parts by weight of the polymeric solid content in the rubber latex. The followings are described as the main reasons. (I) When the content of the high-molecular weight polyanion is less than 2 parts by weight, the sealing effect of the rubber by a film (gel) of an alkaline earth metal salt of the high-molecular weight polyanion is not sufficient. (II) The viscosity of the mixed latex is below the range of 1,000 to 3,000 m·Pa·s, which is the most preferable range, and the shape of the rubber is changed to an irregular shape by an impact when the mixed latex droplets enter a liquid-phase from a gas-phase.

Compared with that, in the present invention, even when the content of the water-soluble polymer compound having a physical gel-forming property is extremely smaller than the content in the above-described invention, for example, even when the content is 0.01 to 1.8 parts by weight relative to 100 parts by weight of the polymeric solid content in the polymer latex, coagulated latex particles having satisfactory powder properties can be produced. This is probably based on suppressing the phenomenon that the shape of latex droplets (coagulated latex particles) is changed to an irregular shape and fine powder is generated by an impact when the latex droplets enter a liquid-phase from the gas-phase by proceeding the coagulation of the polymer latex and the formation of a gel film in a gas-phase, thereby, the above-described properties can be achieved. In addition, viscosity of the polymer latex containing a water-soluble polymer compound having a physical gel-forming property of the present invention is not particularly limited, but from the viewpoint that the polymer latex having viscosity of less than 200 m·Pa·s generally can be applied without problems, the present invention is essentially different from the above-described conventional technique in which the spherical shape of particles is maintained against collisions on the liquid level by increasing the viscosity of a mixed latex.

In the present invention, a method for adding a water-soluble polymer compound having a physical gel-forming property to the polymer latex is not particularly limited. For example, an aqueous solution of the water-soluble polymer compound may be separately prepared and a predetermined amount of the aqueous solution may be added to a polymer latex after polymerization. This method is preferable because of the simple and easy operation. However, the method is not limited to this. For example, a predetermined amount of water-soluble polymer compound in the form of aqueous solution or powder may be added to a polymer latex all together or continuously before or in the course of polymerization or the like as long as an adverse effect in polymerization process, for example, gelation is not caused.

When a water-soluble polymer compound in the form of aqueous solution is added to a polymer latex, the concentration of the aqueous solution of the water-soluble polymer compound is preferably 0.01 to 10% by weight. When the concentration of the aqueous solution of the water-soluble polymer compound is less than 0.01% by weight, a large amount of aqueous solution must be added to the polymer latex in order to add a predetermined amount of the water-soluble polymer compound, and thus the load in wastewater treatment tends to increase. On the other hand, when the concentration of aqueous solution of the water-soluble polymer compound exceeds 10% by weight, the viscosity of the aqueous solution of the water-soluble polymer compound is increased. In such a case, the operationality may be impaired. The mixing operation of the polymer latex and the water-soluble polymer compound is easily performed by adding an aqueous solution of the water-soluble polymer compound to the polymer latex and then wholly stirring the mixture for about a few minutes.

In the present invention, the polymer latex (hereinafter also referred to as a mixed latex) containing a water-soluble polymer compound having a physical gel-forming property is sprayed or dropped into a gas-phase and coagulation can proceed in the gas-phase while the shape of droplets in this state is maintained. The size of droplets when the mixed latex is sprayed or dropped may be freely controlled according to the supply form of dried particles, i.e., a product. The volume-average droplet size is generally 50 µm to 5 mm and preferably 75 µm to 3 mm. The size of droplets when the mixed latex is sprayed or dropped can be indirectly determined by measuring the volume-average particle size of resulting coagulated latex particles with a MICROTRAC FRA-SVRSC (manufactured by NIKKISO Co., Ltd.).

In the present invention, the mixed latex sprayed or dropped in a gas-phase is brought into contact with a coagulant capable of coagulating the latex so as to coagulate the latex and, then, is dropped or fed in a liquid-phase containing a dispersant. The coagulant usable in the present invention should be a substance having both properties of coagulating the polymer latex and causing a gelation of the water-soluble polymer compound. Examples of the coagulant include aqueous solutions of inorganic salts such as sodium chloride, potassium chloride, lithium chloride, sodium bromide, potassium bromide, lithium bromide, potassium iodide, lithium iodide, potassium sulfate, ammonium sulfate, sodium sulfate, ammonium chloride, sodium nitrate, potassium nitrate, calcium chloride, ferrous sulfate, magnesium sulfate, zinc sulfate, copper sulfate, cadmium sulfate, barium chloride, ferrous chloride, magnesium chloride, ferric chloride, ferric sulfate, aluminum sulfate, potassium alum, and iron alum; aqueous solutions of inorganic acids such as hydrochloric acid, sulfuric acid, nitric acid, and phosphoric acid; organic acids such as acetic acid and formic acid and aqueous solutions of the organic acids; aqueous solutions of organic acid salts such as sodium acetate, calcium acetate, sodium formate, and calcium formate; and alcohol solutions of inorganic salts or organic acids such as methanol solutions of sodium chloride, ammonium chloride, sodium bromide, sodium iodide, potassium iodide, magnesium chloride, calcium chloride, barium chloride, magnesium sulfate, zinc sulfate, copper sulfate, acetic acid, or formic acid, and ethanol solutions of sodium chloride, sodium bromide, sodium iodide, potassium iodide, magnesium chloride, calcium chloride, ferric chloride, acetic acid, or formic acid, which may be used alone or in combinations in an aerosol form. Among these, aqueous solutions of inorganic salts such as sodium chloride, potassium chloride, ammonium sulfate, sodium sulfate, ammonium chloride, calcium chloride, ferrous sulfate, magnesium sulfate, zinc sulfate, copper sulfate, cadmium sulfate, barium chloride, ferrous chloride, magnesium chloride, ferric chloride, ferric sulfate, aluminum sulfate, potassium alum, and iron alum; aqueous solutions of inorganic acids such as hydrochloric acid, sulfuric acid, nitric acid, and phosphoric acid; and organic acids such as acetic acid and formic acid and aqueous solutions of the organic acids can be preferably used alone or in combinations of two or more coagulants in an aerosol form. Among these, sodium salts, potassium salts, calcium salts, magnesium salts, aluminum salts, iron salts, barium salts, zinc salts, copper salts, potassium alum, iron alum, hydrochloric acid, sulfuric acid, and nitric acid are preferable, and calcium salts are more preferable.

In the present invention, when water-soluble alginic acid derivatives are used as the water-soluble polymer compound having a physical gel-forming property, it is preferable to suitably use calcium chloride, ferrous sulfate, ferrous chloride, ferric chloride, ferric sulfate, and aluminum sulfate, and among these, it is more preferable to use calcium chloride as a coagulant (gelling agent), from the viewpoint that rigid physical gel can be obtained.

The amount of coagulant (gelling agent), namely, inorganic salt and/or acid used is not necessarily limited, but is preferably 0.2 to 20 parts by weight and more preferably 0.5 to 15 parts by weight relative to 100 parts by weight of the polymeric solid content in polymer latex. When the amount of coagulant (gelling agent) used is less than 0.2 parts by weight relative to 100 parts by weight of the polymeric solid content in polymer latex, the latex may be coagulated insufficiently. On the other hand, when the amount of coagulant (gelling agent) used exceeds 20 parts by weight, the coagulation property is not affected but the amount of coagulant (gelling agent) in wastewater is increased and thus the load in wastewater treatment tends to increase.

Examples of a method for contacting the mixed latex with the coagulant (gelling agent) in the present invention include a method of continuously spraying or dropping droplets of the mixed latex into a coagulable gas-phase atmosphere in which a predetermined amount of an aqueous solution of the coagulant (gelling agent) is continuously sprayed in an aerosol form, thus bringing the mixed latex into contact with the coagulant (gelling agent), but are not limited thereto. The state "aerosol form" is not particularly limited as long as the droplets are in a mist form, but droplets of the coagulant preferably have a volume-average droplet size of preferably 0.01 to 200 μm, more preferably 0.01 to 100 μm, particularly preferably 0.01 to 50 μm, and most preferably 0.01 to 10 μm.

As an operation of making the coagulant in an aerosol form, an example is a process of utilizing a two-fluid nozzle or an atomizer, but is not limited thereto. It is convenient and favorable in terms of the operation to use a coagulant adjusted to have a specified concentration as a solution, but the coagulant is not limited thereto. As a concentration of the coagulant solution, an example is 0.01 to 50% by weight.

In the present invention, water can be fallen down along with the inside wall surface of a container or an apparatus on which a polymer latex, an inorganic salt and/or an acid, and a dispersant are sprayed. According to that, it becomes possible to suppress adhering polymer latex droplets dropped or sprayed in the gas-phase or coagulated latex particles to the inside wall surface of a container or an apparatus. There is no limitation on an amount of water fallen down along with the wall surface, it is satisfactory to set the amount which can suppress adhering on the wall surface, adjusting with an admeasurement or a shape of the container or apparatus, but water is generally fallen down in an amount of preferably 10 to 10,000 parts by weight, more preferably 50 to 5,000 parts by weight based on 100 parts by weight of a polymeric solid content in the polymer latex. When an amount of water fallen down along with the wall surface is less than 10 parts by weight based on 100 parts by weight of a polymeric solid content in the polymer latex, in many cases, the suppression of adhering polymer latex droplets or coagulated latex particles to the inside wall surface of a container or an apparatus tends to be insufficient. On the other hand, when an amount of water fallen down along with the wall surface is more than 10,000 parts by weight based on 100 parts by weight of a polymeric solid content in the polymer latex, it is preferable from the view point of the suppression of adhering polymer latex droplets or coagulated latex particles to the inside wall surface of a container or an apparatus, but a load of waste water treatments tends to increase since a concentration of the polymeric solid content in an aqueous suspension of the obtained coagulated latex particles is lowered. In addition, a temperature of water fallen down along with the wall surface is also not particularly limited, and it can be arbitrarily set with considering properties of the polymer, but it is convenient and favorable in terms of the operation to be generally 0 to 100° C., and preferably 10 to 60° C.

In the present invention, an aqueous suspension of coagulated latex particles prepared by completing granulation may be heated according to need so that aggregation between polymer particles in the coagulated latex particles is accelerated by the heat treatment. Although the heat treatment temperature does not have an upper limit, in general, the heat treatment temperature is preferably up to 120° C. because the operation is simple and easy. Thereby, the mechanical strength of the coagulated latex particles further increases and, in addition, the water content decreases. In addition, this operation is occasionally unnecessary to be carried out since the same effect in the heat treatment operation can be obtained in a granulating process when granulation is conducted at a higher temperature than a polymer softening point. In the heat treatment, a known treatment for preventing aggregation between particles may be performed in order to suppress the coagulation between particles during heating and during drying (or after drying).

Subsequently, dehydrating and drying operations are carried out according to conventional methods. Thus coagulated latex particles of the present invention can be recovered in a powder form.

In the process for producing coagulated latex particles of the present invention, if necessary, additives such as an antioxidant, a heat stabilizer, an ultraviolet absorber, a pigment, an antistatic agent and a lubricant can be suitably added in arbitrary steps in the production process of the present invention, for example, a polymer latex or an aqueous suspension of coagulated latex particles after terminating the coagulation operation.

Coagulated latex particles produced by the present invention can exert excellent effects when used as an impact resistance modifier of thermoplastic resins such as vinyl chloride resins, (meth)acrylic resins, styrene resins, carbonate resins, amide resins, ester resins and olefin resins, or thermosetting resins such as phenol resins, epoxy resins, unsaturated ester resins, urea resins and melamine resin.

EXAMPLES

The present invention will now be described in further detail on the basis of examples, but the present invention is not limited to these examples.

(Measurement of Polymer Softening Temperature)

A dialysis tube knotted with one end (Spectra Biotech Membrane/manufactured by Funakoshi Co., Ltd., pore 1.1, MWCO8000, 16 mm) is charged with 15 g of a polymer latex, and knotted with the other end so as to be in a sausage form, the tube was immersed in 3,000 g of a 3% by weight-calcium chloride aqueous solution having a liquid temperature of 1° C. for 8 hours to completely terminate coagulation, and a coagulated article in the tube shape is obtained. A heat treatment is carried out on the coagulated article obtained herein by immersing in water having a temperature increased by each 5° C. from 5° C. to 60° C. for 10 minutes. The tube coagulated articles obtained at each temperature were dried at 100° C. for 12 hours in a hot air convection dryer to evaporate water. The water content was determined by the following (equation 1):

$$\text{Water content (\%)}=[(Wa-Wb)/Wa]\times 100 \quad \text{(equation 1)}$$

wherein Wa represents the weight of the tube coagulated article before drying and Wb represents the weight of the tube coagulated article after drying, and a temperature at which the water content is at least 5% by weight lower than the water content before heating is assumed to be the polymer softening temperature.

In addition, during coagulating the polymer latex in the calcium chloride aqueous solution having a liquid temperature of 1° C., as for the polymer latex having measured the water content lowering by at least 5% by weight, the polymer softening point thereof is assumed to be at most 0° C.

(Measurement of Fine Powder Content)

The particle size distribution of coagulated latex particles in a suspension prepared in each example and each comparative example was measured with a MICROTRAC FRA-SVRSC (manufactured by NIKKISO Co., Ltd.). The fine powder content (% by weight) was determined from the cumulative frequency (%) of particles having a volume-average particle size of less than 10 μm.

(Measurement of Coarse Particle Content)

A suspension (1,000 g) (solid content: about 10% by weight) containing coagulated latex particles prepared in each example and each comparative example was subjected to suction filtration with an aspirator. Subsequently, the dehydrated resin was recovered and dried at 50° C. for 24 hours in a hot air convection dryer to evaporate water. The resulting dried particles were classified with a 16-mesh sieve. The coarse particle content (% by weight) was determined by the following (equation 2):

$$\text{Coarse particle content (\%)}=[(W1)/(W1+W2)]\times 100 \quad \text{(equation 2)}$$

wherein W1 represents the weight of the dried particles remaining on the 16-mesh sieve and W2 represents the weight of the dried particles passing through the 16-mesh sieve.

(Recovery Rate of Coagulated Latex Particles)

As for coagulated latex particles prepared in each example and each comparative example, a recovery rate of the coagulated latex particles (%) was determined from the cumulative frequency (%) of particles having a diameter of less than 10 μm (fine powder content % by weight) measured with a MICROTRAC FRA-SVRSC (manufactured by NIKKISO Co., Ltd.) and the weight of the dried particles remaining on the 16-mesh sieve obtained by classifying the dried particles with a 16-mesh sieve (coarse particle content % by weight), by the following (equation 3):

$$\text{Recovery rate (\% by weight)}=100-\text{Fine powder content (\% by weight)}-\text{Coarse particle content (\% by weight)} \quad \text{(equation 3)}$$

(Preparation of Polymer Latex A)

Deionized water (130 parts by weight) and sodium lauryl sulfate (0.043 parts by weight) were fed in a glass reactor equipped with a thermometer, a stirrer, a reflux condenser, an inlet for a nitrogen gas, and a unit for adding a monomer and an emulsifier, and the mixture was heated to 50° C. with stirring in a nitrogen flow. Subsequently, a mixture of butyl acrylate (hereinafter also referred to as BA) (8.5 parts by weight) and cumene hydroperoxide (0.02 parts by weight) was fed. After 10 minutes, a mixed solution containing disodium ethylenediaminetetraacetate (0.01 parts by weight), ferrous sulfate heptahydrate (0.2 parts by weight), and distilled water (5 parts by weight); and sodium formaldehyde sulfoxylate (0.2 parts by weight) were fed. After the resulting mixture was stirred for 1 hour, a mixture containing BA (83.0 parts by weight), allyl methacrylate (hereinafter also referred to as AMA) (0.5 parts by weight), and cumene hydroperoxide (0.01 parts by weight) was added dropwise to the mixture over a period of 5 hours. Furthermore, during the addition of the mixture, an aqueous solution of 5% by weight sodium lauryl sulfate, the aqueous solution containing 1 part by weight of sodium lauryl sulfate, was continuously added over a period of 4 hours. After the mixture was added, stirring was continued for 1.5 hours to prepare a crosslinked acrylic rubber polymer. A mixture containing methyl methacrylate (hereinafter also referred to as MMA) (8.0 parts by weight) and cumene hydroperoxide (0.01 parts by weight), which serve as monomeric components used for graft polymerization, was continuously added to the crosslinked acrylic rubber polymer at 50° C. over a period of 30 minutes. After the addition, cumene hydroperoxide (0.1 parts by weight) was added and stirring was continued for 1 hour to complete polymerization. Thus, a polymer latex A having a volume-average particle size of 0.175 μm and a polymeric solid content of 40% by weight, the softening temperature of the polymer being 25° C., was prepared.

(Preparation of Polymer Latex B)

Deionized water (130 parts by weight) and sodium lauryl sulfate (0.043 parts by weight) were fed in a glass reactor equipped with a thermometer, a stirrer, a reflux condenser, an inlet for a nitrogen gas, and a unit for adding a monomer and an emulsifier, and the mixture was heated to 50° C. with stirring in a nitrogen flow. Subsequently, a mixture of BA (8.5 parts by weight) and cumene hydroperoxide (0.02 parts by weight) was fed. After 10 minutes, a mixed solution containing disodium ethylenediaminetetraacetate (0.01 parts by weight), ferrous sulfate heptahydrate (0.2 parts by weight), and distilled water (5 parts by weight); and sodium formaldehyde sulfoxylate (0.2 parts by weight) were fed. After the resulting mixture was stirred for 1 hour, a mixture containing BA (89.0 parts by weight), AMA (0.5 parts by weight), and cumene hydroperoxide (0.01 parts by weight) was added dropwise to the mixture over a period of 5 hours. Furthermore, during the addition of the mixture, an aqueous solution of 5% by weight sodium lauryl sulfate, the aqueous solution containing 1 part by weight of sodium lauryl sulfate, was continuously added over a period of 4 hours. After the mixture was added, stirring was continued for 1.5 hours to prepare a crosslinked acrylic rubber polymer. A mixture containing MMA (2.0 parts by weight) and cumene hydroperoxide (0.01 parts by weight), which serve as monomeric components used for graft polymerization, was continuously added to the crosslinked acrylic rubber polymer at 50° C. over a period of 30 minutes. After the addition, cumene hydroperoxide (0.1 parts by weight) was added and stirring was continued for 1 hour to complete polymerization. Thus, a polymer latex B having a volume-average particle size of 0.175 µm and a polymeric solid content of 40% by weight, the softening temperature of the polymer being at most 0° C., was prepared.

(Preparation of Polymer Latex C)

Deionized water (200 parts by weight), sodium soap produced from beef tallow (2 parts by weight), ferrous sulfate (0.002 parts by weight), disodium ethylenediaminetetraacetate (0.005 parts by weight), tripotassium phosphate (0.2 parts by weight), sodium formaldehyde sulfoxylate (0.2 parts by weight), butadiene (80 parts by weight), styrene (20 parts by weight), and diisopropylbenzene hydroperoxide (0.1 parts by weight) were fed in a pressure-resistant polymerization container equipped with a stirrer, and polymerized was performed at 40° C. for 15 hours. Thus, a rubber latex with a rate of polymerization conversion of 99% was prepared. The resulting rubber latex (278 parts by weight) (polymeric solid content: 92 parts by weight), water (25 parts by weight), sodium soap produced from beef tallow (0.2 parts by weight), ferrous sulfate (0.002 parts by weight), disodium ethylenediaminetetraacetate (0.004 parts by weight), sodium formaldehyde sulfoxylate (0.1 parts by weight), methyl methacrylate (4.0 parts by weight), and styrene (4.0 parts by weight) were fed in a polymerization container equipped with a stirrer, and polymerized was performed at 60° C. for 4 hours. Thus, a polymer latex C with a rate of polymerization conversion of 99% and a polymeric solid content of 32% by weight, the softening temperature of the polymer being at most 0° C., was prepared.

Example 1

The polymer latex A (polymeric solid content: 100 parts by weight) was sprayed as droplets each having a volume-average droplet size of 200 µm into a cylindrical apparatus having a diameter of 60 cm with a spiral flow-type cone nozzle, which is one of pressure nozzles. A nozzle diameter of 0.6 mm was used and the spraying pressure was 3.7 kg/cm². The spray was performed at a height of 5 m from the liquid level at the bottom of the tower.

At the same time, an aqueous solution of calcium chloride with a concentration of 30% by weight as a coagulant was sprayed as droplets each having a droplet size of 0.1 to 10 µm using a two-fluid nozzle while the aqueous solution was mixed with air so that the solid content of calcium chloride was 5 to 15 parts by weight relative to 100 parts by weight of the polymeric solid content. At the same time, an aqueous solution of sodium lauryl sulfate (EMAL 2F Needle: manufactured by Kao Corporation) with a concentration of 3% by weight as a dispersant sprayed in the gas-phase was sprayed as droplets each having a droplet size of 0.1 to 10 µm using a two-fluid nozzle while the aqueous solution was mixed with air so that the solid content of sodium lauryl sulfate was 0.2 part by weight relative to 100 parts by weight of the polymeric solid content. Further, water of being 40° C. is continuously fallen down along with the inside wall of a tower from the top of the tower so as to be about 750 parts by weight relative to 100 parts by weight of the polymeric solid content, and the aqueous solution of sodium lauryl sulfate with a concentration of 3.0% by weight as a dispersant is continuously fed to the fallen water so that the solid content of sodium lauryl sulfate was 0.4 part by weight relative to 100 parts by weight of the polymeric solid content.

The latex droplets dropped into the tower (coagulated latex particles) as well as fallen water were fed in a receiving tank at the bottom of the tower, and an aqueous suspension of the coagulated latex particles having a polymeric solid content of about 10% by weight was obtained. At that time, a temperature of the aqueous suspension in the receiving tank was 40° C.

An aqueous solution of potassium palmitate with a concentration of 5% by weight was added to the resulting aqueous solution of coagulated latex particles so that the solid content of potassium palmitate was 1.0 part by weight relative to 100 parts by weight of the polymeric solid content. After performing a treatment of preventing fusion of coagulated latex particles, the mixture was heated at 70° C. with stirring to perform a heat treatment. Subsequently, the mixture was dehydrated and dried (50° C.×12 hours) to recover the coagulated latex particles.

Example 2

The process was performed as in Example 1 except that the polymer latex B was used, and a temperature of the fallen water was 30° C.

Example 3

The process was performed as in Example 1 except that a mixed latex prepared by adding an aqueous solution of sodium alginate (Algitex LL, manufactured by Kimica Corporation) (having an aqueous solution viscosity of 120 m·Pa·s measured with a B-type viscometer) with a concentration of 1.5% by weight to the polymer latex A (polymeric solid content: 100 parts by weight) so that the solid content of sodium alginate was 0.4 parts by weight relative to 100 parts by weight of the polymeric solid content, and uniformly stirring the whole mixture was used for spraying.

Example 4

The process was performed as in Example 2 except that a mixed latex prepared by adding an aqueous solution of sodium alginate (Algitex LL, manufactured by Kimica Corporation) (having an aqueous solution viscosity of 120 m·Pa·s measured with a B-type viscometer) with a concentration of 1.5% by weight to the polymer latex B (polymeric solid content: 100 parts by weight) so that the solid content of sodium alginate was 0.4 parts by weight relative to 100 parts by weight of the polymeric solid content, and uniformly stirring the whole mixture was used for spraying.

Example 5

The process was performed as in Example 4 except that a partially-saponified polyvinyl alcohol (KH-17: manufactured by The Nippon Synthetic Chemical Industry Co., Ltd.)

in place of sodium lauryl sulfate was used as a dispersant for spraying and adding fallen water.

Example 6

An aqueous solution of sodium alginate (Algitex LL, manufactured by Kimica Corporation) (having an aqueous solution viscosity of 120 m·Pa·s measured with a B-type viscometer) with a concentration of 1.5% by weight was added to the polymer latex B (polymeric solid content: 100 parts by weight) so that the solid content of sodium alginate was 0.4 parts by weight relative to 100 parts by weight of the polymeric solid content, and a mixed latex prepared by uniformly stirring the whole mixture was sprayed in a cylindrical apparatus having a diameter of 60 cm at a height of 5 m from the liquid level at the bottom of the tower and at the spraying pressure of 3.7 kg/cm$^2$ by using a spiral flow-type cone nozzle, which is one of pressure nozzles, having a nozzle diameter of 0.6 mm so that droplets each has a volume-average droplet size of 200 μm.

At the same time, an aqueous solution of calcium chloride with a concentration of 30% by weight as a coagulant was sprayed as droplets each having a droplet size of 0.1 to 10 μm using a two-fluid nozzle while the aqueous solution was mixed with air so that the solid content of calcium chloride was 5 to 15 parts by weight relative to 100 parts by weight of the polymeric solid content. In addition, an aqueous solution of sodium lauryl sulfate with a concentration of 3% by weight as a dispersant sprayed in the gas-phase was sprayed as droplets each having a droplet size of 0.1 to 10 μm using a two-fluid nozzle while the aqueous solution was mixed with air so that the solid content of sodium lauryl sulfate was 0.2 part by weight relative to 100 parts by weight of the polymeric solid content. Further, water of being 30° C. is continuously fallen down along with the inside wall of a tower from the top of the tower so as to be about 750 parts by weight relative to 100 parts by weight of the polymeric solid content, and the aqueous solution of sodium lauryl sulfate with a concentration of 3% by weight as a dispersant is continuously fed to the fallen water so that the solid content of sodium lauryl sulfate was 0.2 part by weight relative to 100 parts by weight of the polymeric solid content.

The latex droplets dropped into the tower (coagulated latex particles) as well as fallen water were fed in a receiving tank at the bottom of the tower, and an aqueous suspension of the coagulated latex particles having a polymeric solid content of about 10% by weight was obtained. At that time, a temperature of the aqueous suspension in the receiving tank was 30° C.

An aqueous solution of potassium palmitate with a concentration of 5% by weight was added to the resulting aqueous solution of coagulated latex particles so that the solid content of potassium palmitate was 1.0 part by weight relative to 100 parts by weight of the polymeric solid content. After performing a treatment of preventing fusion of coagulated latex particles, the mixture was heated at 70° C. with stirring to perform a heat treatment. Subsequently, the mixture was dehydrated and dried (50° C.×12 hours) to recover the coagulated latex particles.

Example 7

The process was performed as in Example 6 except that a partially-saponified polyvinyl alcohol (KH-17: manufactured by The Nippon Synthetic Chemical Industry Co., Ltd.) in place of sodium lauryl sulfate was used as a dispersant for spraying and adding fallen water.

Example 8

The process was performed as in Example 6 except that a partially-saponified polyvinyl alcohol (KH-17: manufactured by The Nippon Synthetic Chemical Industry Co., Ltd.) in place of sodium lauryl sulfate was used as a dispersant for spraying and adding fallen water, and the feeding amount thereof (amount to be added) is each 0.05 parts by weight.

Example 9

The process was performed as in Example 4 except that an aqueous solution of hydroxypropylmethyl cellulose (60SH-4000, manufactured by Shin-Etsu Chemical Co., Ltd.) (having an aqueous solution viscosity of 4,000 m·Pa·s measured with a B-type viscometer) with a concentration of 2.0% by weight was added in place of adding the aqueous solution of sodium alginate so that the solid content of hydroxypropylmethyl cellulose was 0.4 parts by weight relative to 100 parts by weight of the polymeric solid content.

Example 10

The process was performed as in Example 4 except that sodium alginate was added so that the amount was 0.1 parts by weight relative to 100 parts by weight of the polymeric solid content.

Example 11

The process was performed as in Example 4 except that the polymer latex C was used.

Example 12

The process was performed as in Example 4 except that sodium dodecylbenzenesulfonate (NEOPELEX G-15 manufactured by Kao Corporation) in place of sodium lauryl sulfate was used as a dispersant for spraying and adding fallen water.

Example 13

The process was performed as in Example 4 except that sodium dioctyl sulfosuccinate (PELEX OT-P manufactured by Kao Corporation) in place of sodium lauryl sulfate was used as a dispersant for spraying and adding fallen water.

Comparative Example 1

The process was performed as in Example 4 except that spraying a dispersant was not performed, and sodium lauryl sulfate was fed into fallen water in an amount of 0.6 parts by weight relative to 100 parts by weight of the polymeric solid content.

Comparative Example 2

The process was performed as in Example 1 except that sodium alginate was not used.

Table 1 shows granulating conditions of coagulated latex particles (kind of a latex, polymer softening temperature, kind of a dispersant and amount thereof to be added, kind of a water-soluble polymer compound having physical gel-forming property (physical-gel) and amount thereof to be added, and granulating temperature), and Table 2 shows evaluation results of the fine powder content, coarse particle content, and recovery rate of the coagulated latex particles.

TABLE 1

|  | Kind of latex | Polymer softening temperature | Kind of dispersant | Amount of spraying dispersant (part by weight) | Amount of dispersant added to falling water (part by weight) | Kind of physical gel | Amount of physical gel added (part by weight) | Granulating temperature (° C.) |
|---|---|---|---|---|---|---|---|---|
| Ex. 1 | A | 25° C. | Lauryl sulfate Na | 0.2 | 0.4 | None | 0 | 40 |
| Ex. 2 | B | at most 0° C. | Lauryl sulfate Na | 0.2 | 0.4 | None | 0 | 30 |
| Ex. 3 | A | 25° C. | Lauryl sulfate Na | 0.2 | 0.4 | Alginate Na | 0.4 | 40 |
| Ex. 4 | B | at most 0° C. | Lauryl sulfate Na | 0.2 | 0.4 | Alginate Na | 0.4 | 30 |
| Ex. 5 | B | at most 0° C. | PVA | 0.2 | 0.4 | Alginate Na | 0.4 | 30 |
| Ex. 6 | B | at most 0° C. | Lauryl sulfate Na | 0.2 | 0.2 | Alginate Na | 0.4 | 30 |
| Ex. 7 | B | at most 0° C. | PVA | 0.2 | 0.2 | Alginate Na | 0.4 | 30 |
| Ex. 8 | B | at most 0° C. | PVA | 0.05 | 0.05 | Alginate Na | 0.4 | 30 |
| Ex. 9 | B | at most 0° C. | Lauryl sulfate Na | 0.2 | 0.4 | Cellulose | 0.4 | 30 |
| Ex. 10 | B | at most 0° C. | Lauryl sulfate Na | 0.2 | 0.4 | Alginate Na | 0.1 | 30 |
| Ex. 11 | C | at most 0° C. | Lauryl sulfate Na | 0.2 | 0.4 | Alginate Na | 0.4 | 30 |
| Ex. 12 | B | at most 0° C. | Dodecyl-benzenesulfonate Na | 0.2 | 0.4 | Alginate Na | 0.4 | 30 |
| Ex. 13 | B | at most 0° C. | Dioctyl sulfosuccinate Na | 0.2 | 0.4 | Alginate Na | 0.4 | 30 |
| Com. Ex. 1 | B | at most 0° C. | Lauryl sulfate Na | 0 | 0.6 | Alginate Na | 0.4 | 30 |
| Com. Ex. 2 | B | at most 0° C. | None | 0 | None | None | 0 | 30 |

TABLE 2

|  | Fine powder content (% by weight) | Coarse particle content (% by weight) | Recovery rate (% by weight) |
|---|---|---|---|
| Ex. 1 | 0.2 | 0.1 | 99.7 |
| Ex. 2 | 0 | 0.1 | 99.9 |
| Ex. 3 | 0 | 0 | 100 |
| Ex. 4 | 0 | 0 | 100 |
| Ex. 5 | 0 | 0 | 100 |
| Ex. 6 | 0 | 0.1 | 99.9 |
| Ex. 7 | 0 | 0.1 | 99.9 |
| Ex. 8 | 0 | 0.5 | 99.5 |
| Ex. 9 | 0 | 0.4 | 99.6 |
| Ex. 10 | 0 | 0.2 | 99.8 |
| Ex. 11 | 0 | 0 | 100 |
| Ex. 12 | 0 | 0 | 100 |
| Ex. 13 | 0 | 0 | 100 |
| Com. Ex. 1 | 0 | 1.1 | 98.9 |
| Com. Ex. 2 | 0 | 100 | 0 |

It is cleared from the respective Examples and Comparative Example 1 that the generated coarse particles content can be reduced at the extremely high level by spraying a dispersant in an aerosol form at granulating. It is also cleared from the comparison between Examples 1 to 2 and Example 3 to 4 that the coarse particles content and the fine powder content can be reduced by containing a water-soluble polymer compound having a physical gel-forming property in a polymer latex, compared with the case where the water-soluble polymer compound is not used.

It is further shown that a polymer latex having a polymer softening temperature of at most 0° C. also can be recovered as coagulated latex particles with less fine powder or coarse particles, having an extremely high yield under the moderate temperature condition by using the process of the present invention.

INDUSTRIAL APPLICABILITY

According to the production method of the present invention, secondary agglomeration can be suppressed under temperature conditions at higher than a softening temperature of a polymer without degradation of qualities originally owned by a polymer, and the desired coagulated latex particles can be recovered at remarkably high yield.

The invention claimed is:

1. A process for producing coagulated latex particles comprising:

spraying or dropping a polymer latex into a gas-phase containing, in aerosol form, a first dispersant and at least one compound selected from the group consisting of an inorganic salt and an acid wherein droplets of polymer latex are formed; and dropping or feeding the droplets of polymer latex into a liquid-phase containing a second dispersant, wherein the polymer latex contains a water-soluble polymer compound having a physical gel-forming property, and wherein each of the first and the second dispersants is an anionic surfactant.

2. The process for producing coagulated latex particles according to claim 1, wherein the softening temperature of the polymer in the polymer latex is at most 60° C.

3. The process for producing coagulated latex particles according to claim 1, wherein an amount of the first dispersant in aerosol form in the gas-phase is 0.01 to 10 parts by weight based on 100 parts by weight of the polymer solids content in the polymer latex, and an amount of the second dispersant in the liquid-phase is 0.01 to 10 parts by weight based on 100 parts by weight of the polymer solids content in the polymer latex.

4. The process for producing coagulated latex particles according to claim 3, wherein the amount of the first dispersant in aerosol form in the gas-phase is 0.1 to 5 parts by weight, and the amount of the second dispersant in the liquid-phase is 0.1 to 5 parts by weight.

5. The process for producing coagulated latex particles according to claim 1 wherein the content of the water-soluble polymer compound having a physical gel-forming property is in an amount of from 0.01 to 3.0 parts by weight based on 100 parts by weight of the polymer solids content in the polymer latex.

6. The process for producing coagulated latex particles according to claim 5, wherein the content of the water-soluble polymer compound is in an amount of from 0.05 to 1.8 parts by weight of the polymer solids content.

7. The process for producing coagulated latex particles according to claim 1, wherein the anionic surfactant is at least one kind selected from the group consisting of carboxylates, sulfonates, salts of a sulfate ester, and salts of a phosphate ester.

8. The process for producing coagulated latex particles according to claim 1, wherein the water-soluble polymer compound having a physical gel-forming property is at least one compound selected from the group consisting of hydroxyethylmethyl cellulose, hydroxypropylmethyl cellulose, carboxymethyl cellulose, water-soluble alginic acid derivatives, agar, gelatin, carrageenan, pectin, and polyacrylic acid derivatives.

9. The process for producing coagulated latex particles according to claim 8, wherein the water-soluble polymer compound having a physical gel-forming property is a water-soluble alginic acid derivative.

10. The process for producing coagulated latex particles according to claim 1, wherein the gas-phase contains 0.2 to 20 parts by weight of at least one compound selected from the group consisting of the inorganic salt and the acid relative to 100 parts by weight of the polymer solids content in the polymer latex.

11. The process for producing coagulated latex particles according to claim 1, wherein the inorganic salt is at least one salt selected from the group consisting of sodium salts, potassium salts, calcium salts, magnesium salts, aluminum salts, iron salts, barium salts, zinc salts, copper salts, potassium alum, and iron alum.

12. The process for producing coagulated latex particles according to claim 11, wherein the inorganic salt is a calcium salt.

13. The process for producing coagulated latex particles according to claim 1, wherein the acid is at least one acid selected from the group consisting of an inorganic acid and an organic acid,
wherein the inorganic acid is at least one acid selected from the group consisting of hydrochloric acid, sulfuric acid, nitric acid, and phosphoric acid, and
wherein the organic acid is at least one acid selected from the group consisting of acetic acid and formic acid.

14. The process for producing coagulated latex particles according to claim 1, wherein the polymer latex sprayed or dropped into the gas-phase has a volume-average droplet size of 50 μm to 5 mm.

15. The process for producing coagulated latex particles according to claim 1, wherein the content of polymer solids in the polymer latex is in an amount of from 10 to 55% by weight.

16. The process for producing coagulated latex particles according to claim 1, comprising:
flowing down water along an inside wall of a container to which the polymer latex, the first dispersant and at least one selected from the group consisting of the inorganic salt and the acid are sprayed
wherein the content of the water is in an amount of from 10 to 10,000 parts by weight based on 100 parts by weight of the polymer solids content in the polymer latex.

* * * * *